United States Patent Office 3,391,139
Patented July 2, 1968

3,391,139
PREPARATION OF 3-NITRO-AZACYCLOHEP-
TANE-2-ONE 1-CARBOCHLORIDE
Ulrich Verstrijden, Geleen, and Johannes J. M. Deumens, Nuth, Netherlands, assignors to Stamicarbon N.V., Heerlen, Netherlands
No Drawing. Filed July 29, 1965, Ser. No. 475,893
Claims priority, application Netherlands, Aug. 5, 1964, 6408990
8 Claims. (Cl. 260—239.3)

ABSTRACT OF THE DISCLOSURE

A process for preparing 3-nitro-azacycloheptane-2-one 1-carbochloride by reacting 2-chloro-azacyclo-2,3-heptene-1 carbochloride with a nitrating agent in liquid sulfur dioxide at a temperature below 30° C. and hydrolyzing the resulting reaction product at a temperature below 50° C.

---

The present invention relates to an improvement in processes for preparing 3-nitro-azacycloheptane-2-one 1-carbochloride by reaction of 2-chloro-azacyclo-2,3-heptene 1-carbochloride with a nitrating agent, followed by hydrolysis of the resulting reaction product at a temperature below 50° C.

The nitrating agent used in a known process (see U.S. patent specification 3,031,443) usually consists of a mixture of concentrated nitric acid and concentrated sulfuric acid. In order to obtain a smooth nitration reaction, it is conventional to use a rather large amount of sulfuric acid in proportion to the nitric acid, e.g., 3 moles of sulfuric acid per mole of nitric acid. As a result, a large amount of so-called waste acid, which is mainly sulfuric acid, becomes available after the nitration. If sulfur trioxide is used in the nitrating agent, a considerable amount of waste acid is still obtained because the presence of sulfuric acid remains necessary in addition to the sulfur trioxide to prevent crystallization of $HNO_3$-$SO_3$ mixtures.

The processing of this waste acid, which consists mainly of sulfuric acid, to make it suitable for recirculation to the nitration process involves great technical difficulties. It is, therefore, usually preferred to convert the waste acid with ammonia to ammonium sulfate, which can be used as a fertilizer. However, in view of the relatively large amount of waste acid that becomes available, this means a considerable secondary production of ammonium sulfate. This may be an undesirable situation from an economic point of view.

It is, therefore, an object of the present invention to provide an improved and economical process for the production of 3-nitro-azacycloheptane-2-one 1-carbochloride.

It is another object to provide a process for the production of 3-nitro-azacycloheptane-2-one 1-carbochloride without the direct addition of sulfuric acid.

Still other objects will become apparent from the following detailed description; it should be understood, however, that the detailed description and specific examples, while indicating preferred embodiments of the invention, are given by way of illustration only, since various changes and modifications within the spirit and scope of the invention will become apparent to those skilled in the art from this detailed description.

The invention provides a process for the preparation of 3-nitro-azacycloheptane-2-one 1-carbochloride whereby the amount of waste acid per unit of the nitro product prepared becomes considerably reduced. This process is characterized in that the nitration reaction with the nitrating agent is carried out in liquid sulfur dioxide at a temperature below 30° C.

As mentioned above, if a mixture of sulfur trioxide and nitric acid is used as the nitrating agent, the presence of a large amount of sulfuric acid is still necessary to prevent the crystallization of $HNO_3$-$SO_3$ mixtures. Unexpectedly, we have found that the addition of sulfuric acid becomes unnecessary if the nitration reaction is carried out in the presence of sulfur dioxide. Furthermore, and contrary to expectations, the sulfur dioxide appears to have a non-reducing influence on the nitric acid in the presence of sulfur trioxide. Thus, the sulfur dioxide can be recovered virtually water-free in a simple way and be re-used.

By preference, the nitrating acid used is nitric acid and sulfur trioxide in substantially equimolecular proportions. In this manner, a very high yield is obtained. A moderate deviation from the equimolecular proportion, e.g., of 10%, is feasible.

The pressure of the nitration reaction and the method of removing the heat of reaction can be varied. For example, the pressure can be varied to control the temperature of the nitration reaction. By preference, however, the reaction is carried out at atmospheric pressure and at least part of the reaction heat is removed by evaporation of liquid sulfur dioxide. This method of heat removal offers the advantage that the temperature of the reaction mixture can be better controlled so that local overheating, which may give rise to explosions, is eliminated.

The hydrolysis following the reaction with the nitrating acid is preferably carried out in the presence of a water-immiscible organic solvent for 3-nitro-azacycloheptane-2-one 1-carbochloride. As the water-immiscible organic solvent, we prefer to use nitrobenzene. The hydrolysis product is then obtained as a solution from which it can be easily separated in a pure form. Alternatively, the hydrolysis product may be directly subjected to subsequent reaction such as a conversion e.g., to α-nitro ε-caprolactam by hydrolysis at a temperature over 50° C. The water for the first hydrolysis can be added after the reaction mixture and the organic solvent have been brought together and the sulfur dioxide has been removed. Preferably, however, the reaction mixture is brought together with a mixture of water and the organic solvent and then the sulfur dioxide is removed.

The following example serves further to illustrate the invention.

EXAMPLE

The preparation of 3-nitro-azacycloheptane-2-one 1-carbochloride was carried out at atmospheric pressure in a continuous process with the application of a substantially equimolecular mixture of nitric acid and sulfur trioxide as the nitrating agent.

800 grams of liquid sulfur dioxide, 200 grams of sulfur trioxide, 148 grams of 98%-by-weight nitric acid, and 400 grams of 2-chloro-azacyclo-2,3-heptene 1-carbochloride were fed per hour to a reaction vessel provided with a stirrer and a reflux cooler. The mean residence time of the reaction mixture in the reaction vessel was about 1 hour and the temperature was kept at −2° C. by condensation, in the reflux cooler, of sulfur dioxide evaporated by the reaction heat. The reaction mixture was then passed into a second reaction vessel which was properly stirred. 2000 grams of nitrobenzene and 1500 grams of water were introduced per hour into the second vessel. The temperature in this reaction vessel was kept at about 10° C. by external cooling. The reaction mixture was then separated into a water fraction and a nitrobenzene fraction in a separator, the water fraction being subjected to an extraction with nitrobenzene in a column and the resulting nitrobenzene fraction being added to the original nitrobenzene fraction. The total nitrobenzene fraction was subsequently freed of the sulfur dioxide dissolved in it by heating and by passing nitrogen through it. The nitrobenzene fraction was then passed into a spray drier from which 444 grams of 3-nitro-azacycloheptane-2-one 1-carbochloride was separated per hour. This means a yield of 98% calculated to 2-chloro-azacyclo-2,3-heptene 1-carbochloride.

What is claimed is:
1. In a process for preparing 3-nitro-azacycloheptane-2-one 1-carbochloride by reaction of 2-chloro-azacyclo-2,3-heptene 1-carbochloride with a nitrating agent, followed by hydrolysis of the resulting reaction product, at a temperature below 50° C. the improvement consisting essentially of carrying out the reaction with the nitrating agent in liquid sulfur dioxide at a temperature below 30° C.
2. The process according to claim 1 wherein the nitrating agent is a mixture of nitric acid and sulfur trioxide.
3. The process according to claim 2 wherein the nitric acid and sulfur trioxide are present in substantially equal molar proportions.
4. The process according to claim 1 wherein the reaction with the nitrating agent is carried out at atmospheric pressure and at least part of the heat liberated in the reaction is removed by evaporation of liquid sulfur dioxide.
5. The process according to claim 1 wherein the hydrolysis is carried out in the presence of a water-immiscible organic solvent for 3-nitro-azacyclo-heptane-2-one 1-carbochloride.
6. The process according to claim 5 wherein the organic solvent is nitrobenzene.
7. The process according to claim 5, wherein the reaction mixture is hydrolyzed by first mixing with a mixture of water and organic solvent, and then removing the sulfur dioxide contained therein.
8. The process according to claim 5, wherein the reaction mixture is hydrolyzed by:
mixing with the organic solvent,
removing the sulfur dioxide contained therein,
and adding the water for the hydrolysis.

References Cited
UNITED STATES PATENTS
3,031,443   4/1962   Ottenheym et al. ___ 260—239.3

JOHN D. RANDOLPH, *Primary Examiner.*

WALTER A. MODANCE, *Examiner.*

R. T. BOND, *Assistant Examiner.*